INVENTOR
JOSEPH J. RILEY
ATTORNEYS

April 28, 1970 J. J. RILEY 3,509,310
APPARATUS FOR CONTROLLING THE OPERATION OF FLASH WELDING
SYSTEMS UTILIZING ELECTRO-HYDRAULIC SERVO MECHANISMS
Filed April 10, 1967 8 Sheets-Sheet 2
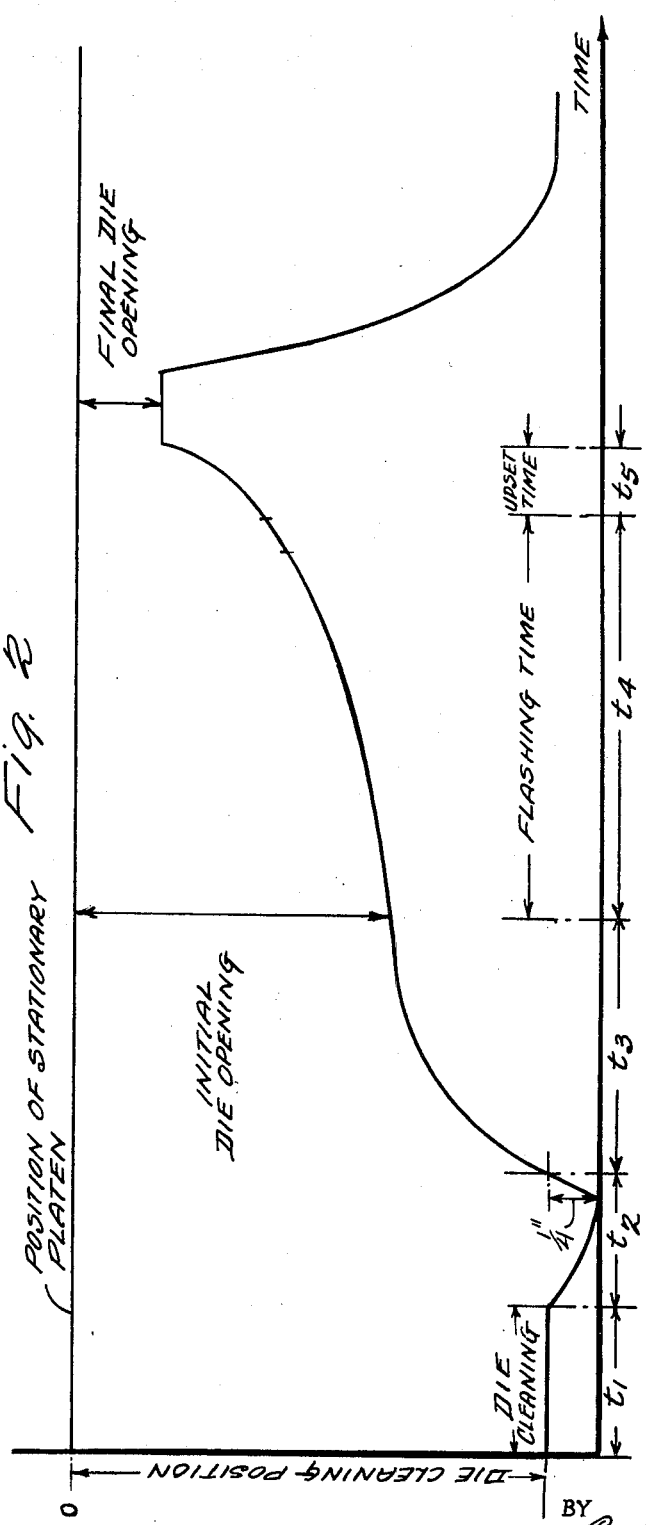
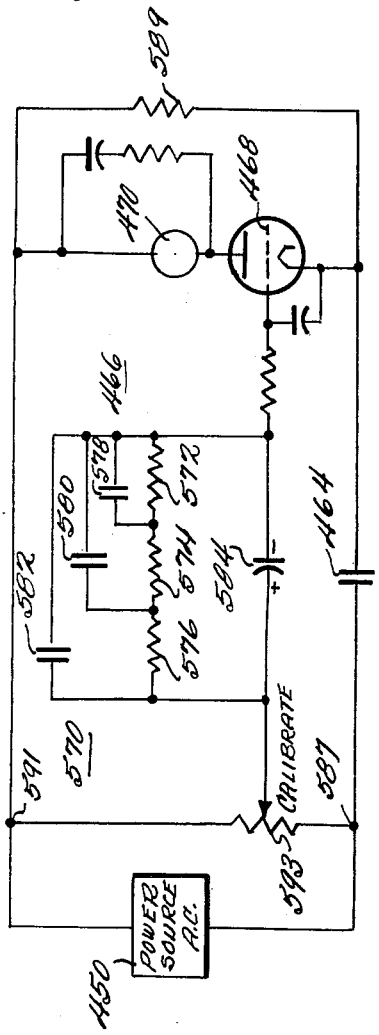
INVENTOR
JOSEPH J. RILEY
BY
Cushman, Darby & Cushman
ATTORNEYS

INVENTOR
JOSEPH J. RILEY

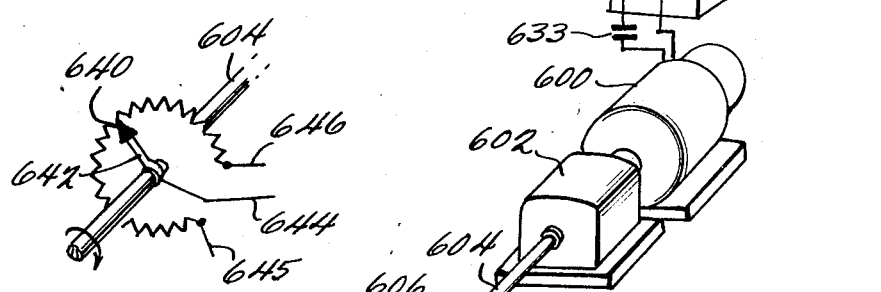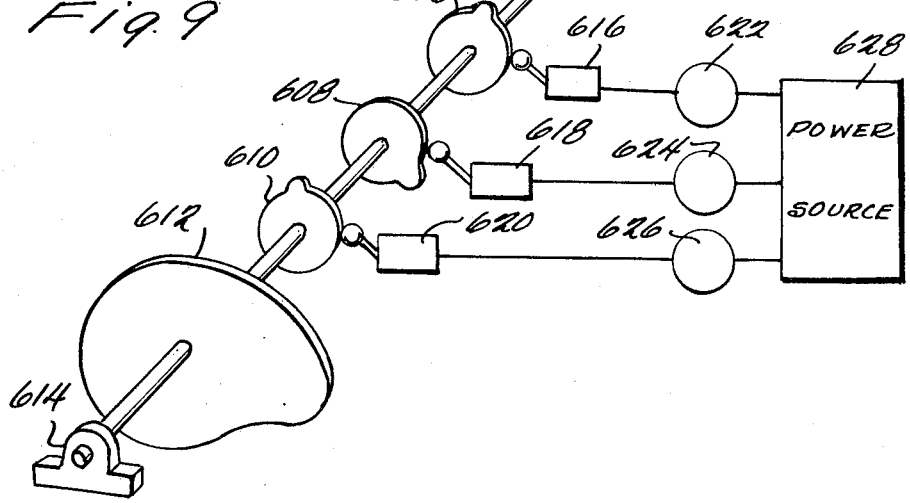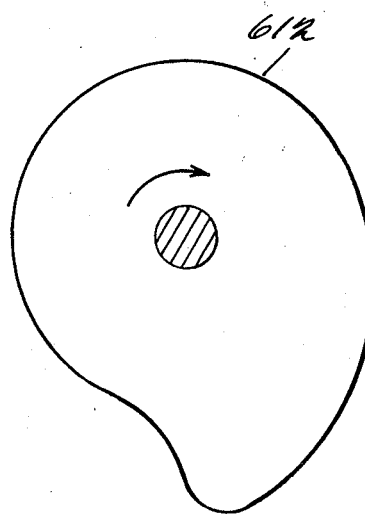

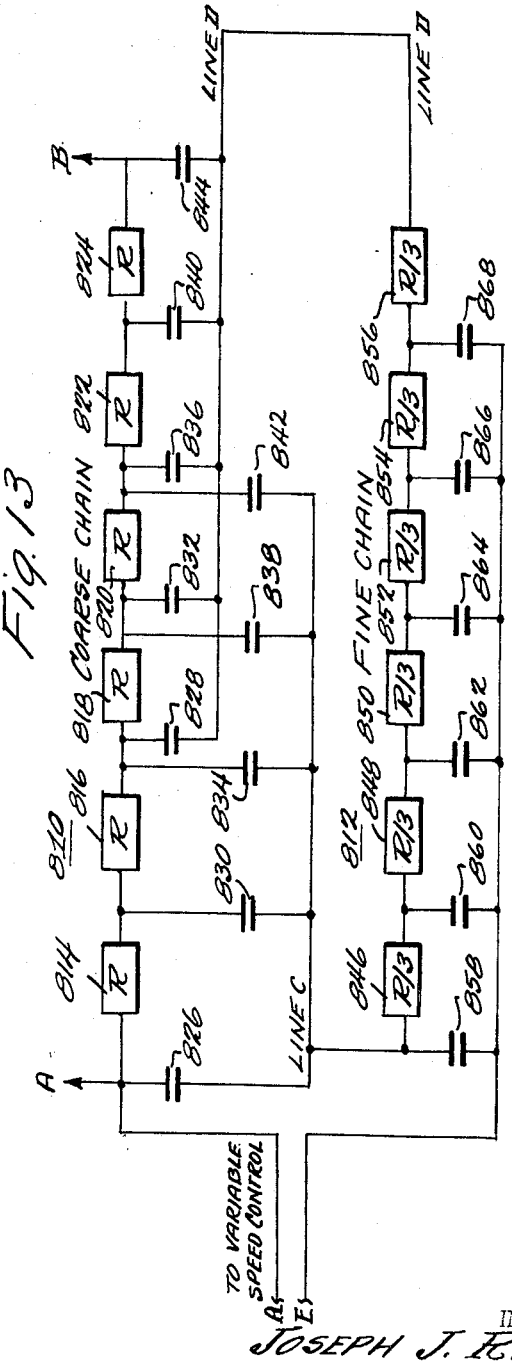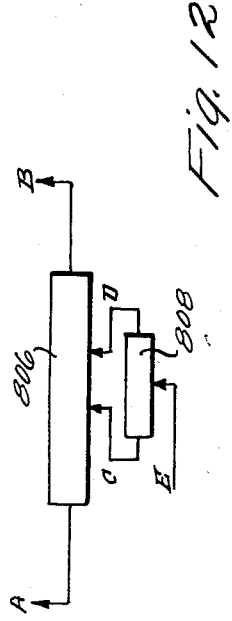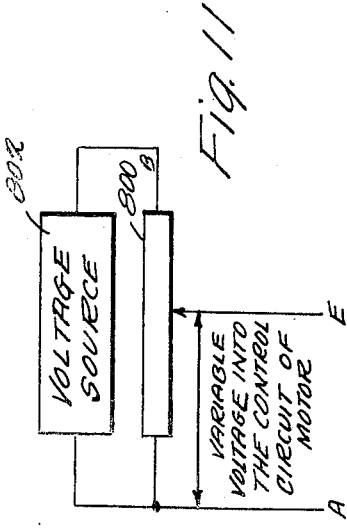

United States Patent Office

3,509,310
Patented Apr. 28, 1970

3,509,310
APPARATUS FOR CONTROLLING THE OPERATION OF FLASH WELDING SYSTEMS UTILIZING ELECTRO-HYDRAULIC SERVO MECHANISMS
Joseph J. Riley, Warren, Ohio, assignor to The Taylor-Winfield Corporation, Warren, Ohio, a corporation of Ohio
Filed Apr. 10, 1967, Ser. No. 629,519
Int. Cl. B23k 11/04
U.S. Cl. 219—97                                                        34 Claims

ABSTRACT OF THE DISCLOSURE

Control system flash welding apparatus utilizing electro-hydraulic servo mechanisms. An electrical signal corresponding to the instantaneous position of a movable workpiece with respect to a stationary one is applied as one input to the servo control system while the other electrical input signal is a command signal indicating the desired position of the movable workpiece with respect to the other. Any difference between the signals at these two inputs is used to position the movable workpiece in a conventional way. During flashing time, the above command signal is established by the curvature of a mechanical cam which drives a linear potentiometer, the potentiometer output being applied as an input to the servo system. The various parameters which must be selected for a given welding schedule are digitally selected, that is, through data processing equipment such as a card reader. Thus, the space bar position, gauge bar position, welding transformer primary voltage, flashing heat control, upset heat control, flashing distance, upset current time and flashing time can all be digitally selected preparatory to the welding operation. Further the selection of the initial die opening is interlocked with the preselected space bar position in such a manner that once the space bar position is established, the initial die opening is also established.

---

This invention relates to improved apparatus for controlling the operation of a flash welding system utilizing electro-hydraulic servo mechanisms. In particular, this invention relates to the use of mechanical cams to actuate an electro-hydraulic servo system with an appropriate command signal during flashing time, the relative motion of a movable workpiece with respect to another being determined by the curvature of the mechanical cam. Also, this invention relates to improved flash welding apparatus, the various control parameters of which may be selected through digital data processing equipment such as a card reader. Further, the invention relates to improved control apparatus for a flash welding system whereby the selection of the initial die opening is interlocked with the establishment of a preselected space bar position.

Heretofore, control systems for flash welding apparatus of this type have had numerous human operator functions to accomplish the selection of the parameters of a welding schedule and to perform the functions in proper sequence. Such systems have had the disadvantages of resulting in less than optimum weld quality, loss of production time due to rewelding obviously poor welds, loss of production time due to increased maintenance of apparatus resulting from human errors, and a slower apparatus sequence at all times. Lost production time is prohibitive, particularly when welding apparatus is used in continuous processing lines where production time is worth several thousand dollars per hour. Reduced weld quality results in loss of time and costly welded material in processing of welds in operations subsequent to welding. Thus it is a primary object of this invention to provide an improved control system for a flash welding apparatus wherein the design provides faster, error-free operation and improves weld quality.

A flash welding system includes various parameters which must be preselected before commencement of the welding operation. Thus the space bar position (related to initial die opening), gauge bar position (related to final die opening), welding transformer secondary voltage, flashing heat control, upset heat control, flashing distance, upset current time and flashing time should all be preselected. As can be appreciated, this is a large number of parameters which must be selected and because of the tendency of the human operator to occasionally make mistakes, the present invention provides means for placing the selection of these parameters under the control of digital data processing equipment such as a card reader. Each column of a control card may correspond to one of the parameters to be preselected. Thus after such a card has been punched and verified, the chance of production slow down (due to the operator incorrectly preselecting one or more of the above parameters) is reduced to an absolute minimum.

Thus a further primary object of this invention is to provide an improved control system for flash welding apparatus where the control system is preconditioned by digital data processing equipment such as a card reader.

Other objects and advantages of this invention will become apparent upon reading the appended claims in conjunction with the following detailed description and the attached drawings in which:

FIGURE 2 is a graph illustrating relative positions of the platens during a typical flash welding schedule;

FIGURE 6 is a schematic circuit illustrating the upset current time control which is broadly indicated in FIGURE 4;

FIGURE 7 is a partial schematic and diagrammatic representation of illustrative apparatus and circuitry for selecting the type of flashing curve and the amount of flashing time;

FIGURE 8 is a detailed illustrative embodiment of a mechanical cam and a linear potentiometer for generating the flashing curve;

FIGURE 9 is a diagrammatic illustration of a non-linear potentiometer which may be used in place of the arrangement shown in FIGURE 8;

FIGURE 11 shows the type of potentiometer network required for the variable speed D.C. motor employed in the invention;

FIGURE 12 illustrates how the potentiometer network of FIGURE 11 must be modified to permit digital selection of the motor speed while at the same time maintaining constant loading; and FIGURE 13 is an illustrative embodiment of the resistive network equivalent of the circuitry shown in FIGURE 12.

Figure 1:
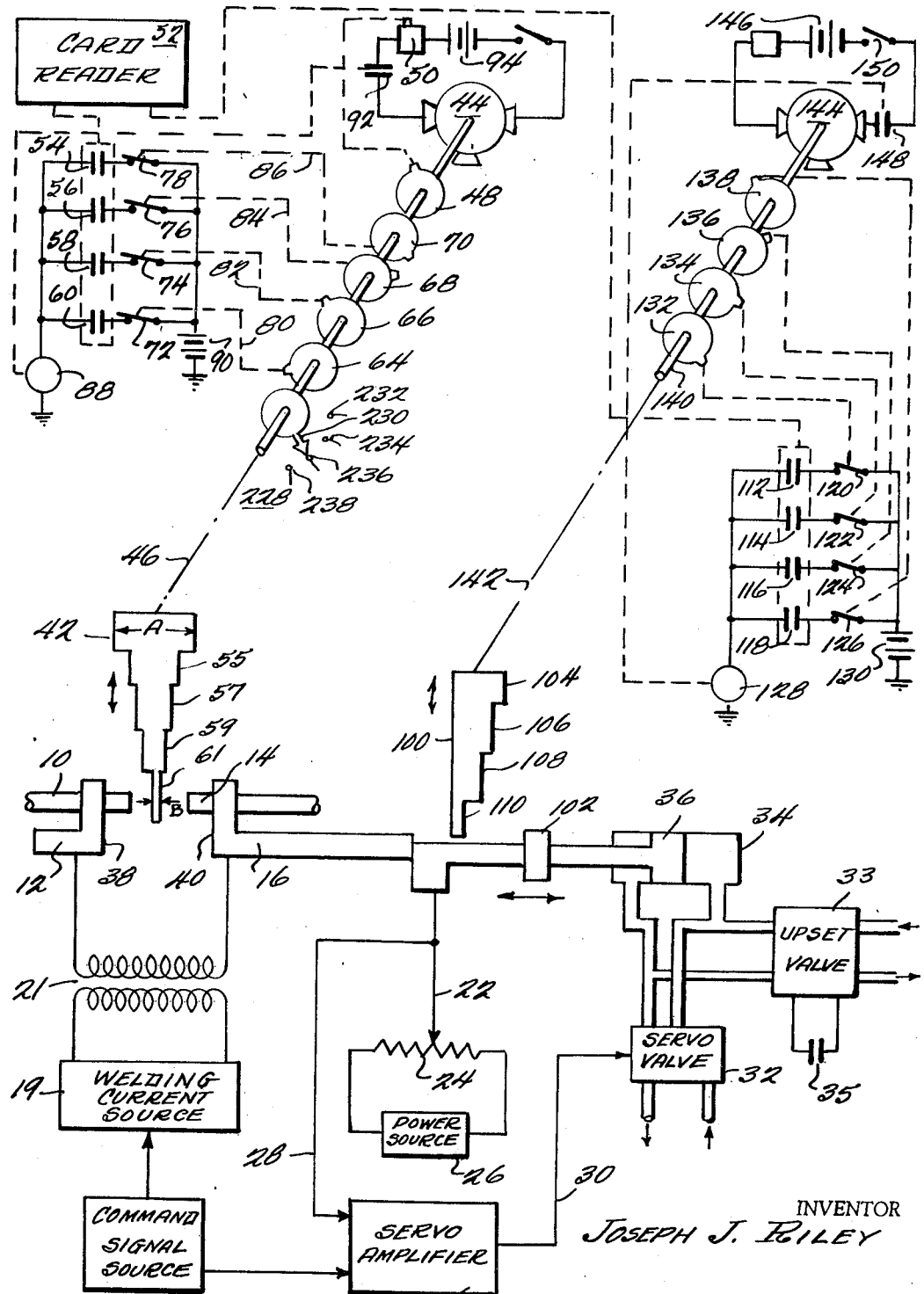
FIGURE 1 is a combined diagrammatic representation and block diagram of a flash welding system utilizing the improvements of this invention.

Reference should now be made to FIGURE 1 which shows an overall flash welding control system utilizing an electro-hydraulic servo mechanism. Workpiece 10, which typically is a sheet of metal such as steel ranging from 25–100 inches wide and several thousandths of an inch to a quarter-inch thick, is clamped in a stationary platen 12 prior to the commencement of the welding operation.

Workpiece 14 is typically a sheet of metal which is to be welded to sheet 10. Sheet 14 is clamped into a movable platen 16. The movement of platen 16 with respect to platen 12 is controlled by signals from command signal source 18. That is, each magnitude of the signal output from source 18 corresponds to a unique position of platen 16 with respect to platen 12. The command signal from source 18 is applied to servo amplifier 20. Also applied to servo amplifier 20 is a signal indicative of the instantaneous position of the movable platen 16 with respect to platen 12. This signal is generated typically by a wiper 22, which is in mechanical contact with the platen 16. As the wiper 22 moves along feedback potentiometer 24 (which is supplied with voltage from battery 26), the position indicating signal is applied over the line 28 to servo amplifier 20.

Whenever the command signal from source 18 is different from the position indicating signal on line 28, an error signal is applied over line 30 to servo valve 32. The magnitude of the error signal determines the amount of fluid metered to actuator cylinder 34, and, in turn, the amount of fluid metered to actuator 34 establishes the position of the movable platen 16, since the platen 16 is mechanically connected to the piston 36 of actuator cylinder 34.

Preparatory to the welding operation, the space bar 42 must be moved to various positions for different reasons. Means are illustrated for moving the space bar. However, it will be understood that the illustrated space bar positioning means are only briefly indicated since the means for accomplishing this are well known. Rather, an amount sufficient to clearly illustrate how the space bar positioning means are placed under the control of card reader 52 are shown.

First, faces 38 and 40 of platens 12 and 16, respectively, must be cleaned off inasmuch as various foreign material accumulates on these faces during each welding operation. Thus, in a manner which will be described in more detail hereinafter, a command is generated from source 18 which positions platen 16 a predetermined distance from a stationary platen 12. This distance is termed the die cleaning distance and is equal to the distance A shown in the space bar 42. Thus, when the die cleaning distance is established between 12 and 16, the space bar 42 is caused to move downwardly between the platens 12 and 16 and scrape the faces 38 and 40 clean of any foreign material. Of course, during the die cleaning operation, the strips 10 and 14 are not clamped in place to platens 12 and 16.

The movement of space bar 42 is controlled by a reversible motor 44, through appropriate mechanical linkage indicated at 46. As is known to those of ordinary skill in this art, various other means are available for controlling the movement of space bar 42, such as fluid actuator means. When the space bar 42 reaches the bottom of the platens 12 and 16, a lobed cam 48 on the shaft of motor 44 transfers a limit switch (not shown) disposed in reversing means 50, thereby causing the space bar 42 to reverse its direction and move upwardly.

The amount of distance the space bar 42 moves upwardly is determined by data processing equipment or card reader 52. That is, card reader 52 will read control information from an appropriate column in a data input card. For example, if the first column of the data input card corresponds to the space bar position, the particular position where it is decided to stop, the space bar will be determined by a particular number punched in the column corresponding to the desired space bar position. This will be described in more detail hereinafter with respect to FIGURES 9 and 10.

The position where the space bar stops in its upward movement is a function of the thickness of the particular sheets being welded. Normally open relay contacts 54, 56, 58, and 60 are respectively responsive to relays (not shown in FIGURE 1) in the card reader depending on the particular space bar position pre-selected. Lobed cams 64, 66, 68, and 70 are respectively associated with limit switches 72, 74, 76, and 78, via appropriate linkages 80, 82, 84, and 86.

Space bar 42 includes portions 55, 57, 59, and 61 which, respectively, correspond to the four positions to which the space bar can be moved. Further, portions 55–61 are respectively associated with limit switches 72–78.

Hence, if portion 61 of the space bar is selected, the contact 54 is closed. The motor 44 will be de-energized when the space bar portion 61 is adjacent the position where the strips 10 and 14 are clamped.

To de-energize motor 44, relay 88 is provided in series with switch 78, relay contact 54 and battery 90. Relay 88 controls relay normally opened contact 92 and the energizing circuit for motor 44. Thus when limit switch 78 is opened (normally closed and opened by rotating cam 70 when portion 61 is adjacent to the loading positions of the strips 10 and 14), relay 88 is de-energized to open contact 92 and disconnect the motor 44 from its energizing source 94. The number of space bar positions is, of course, arbitrary.

After the space bar 42 is placed in position, the strips or workpieces 10 and 14 are clamped in position. Once the workpieces 10 and 14 are clamped in place, workpieces 10 and 14 are positioned adjacent the opposite faces of portion 61 of the space bar. Generally, the space bar portion selected corresponds to the thickness of the material being welded. The thicker the sheet of material being welded, the thinner the space bar portion required. This follows since more metal must be burned off to insure a satisfactory weld when the material is relatively thick.

Also preparatory to the actual welding operation, the gauge bar 100 is positioned to establish the final die opening after the welding operation has been completed. Various gauge bar positioning means are also known to those of ordinary skill in this art and thus only those features necessary to illustrate control by card reader 52 will be described.

The position of the gauge bar 100 with respect to upset nut 102 establishes what the final die opening will be. Gauge bar 100 includes portions 104, 106, 108, and 110 which respectively correspond to the four available final die positions. Of course, the number of positions is arbitrary. If portion 104 is positioned adjacent nut 102, the final die opening will be maximized whereas if portion 110 is positioned adjacent nut 102 (as shown in FIGURE 1), the final die opening will be minimized. Of course, portion 106 and portion 108 provide final die openings intermediate the maximum and minimum openings corresponding to portions 104 and 110, respectively. The positioning of gauge bar 100 is accomplished in a manner quite similar to the positioning of space bar 42. The arrangement for accomplishing positioning of gauge bar 100 includes card reader 52; relay contacts 112, 114, 116, and 118; limit switches 120, 122, 124, and 126, respectively, in series with contacts 112 through 118; relay 128; battery 130; and cams 132, 134, 136 and 138 on shaft 140 respectively controlling switches 120 through 126. Shaft 140 is mechanically connected to gauge bar 100 through appropriate mechanical linkage 142 and driven from a reversible D.C. motor 144. Other positioning means other than motor 144 may be employed such as a fluid actuated type of means. Motor 144 is energized from D.C. source 146 through the normally open relay contacts 148 which are under the control of relay 128.

In order to preselect a given position of the gauge bar, a card is fed into the card reader 52. The preselected column corresponding to the gauge bar position is punched with a number corresponding to the desired final die opening. This will cause one of the relay contacts 112 through 118 to be closed since a relay (not shown) in the card reader corresponding to the above punched number will be energized, thereby closing its respective contact. After this preselection, motor 144 is energized by the closure of switch 150 and starts to move the gauge bar 100 downwardly. As the shaft 140 rotates the limit switches 120 through 126 will be sequentially opened. When the limit switch in series with the relay contacts selected from contacts 112 through 118, is opened, relay 128 is de-energized from source 130 thereby opening contacts 148, stopping motor 144, and positioning gauge bar 100 at desired position with respect to nut 102.

Other parameters must also be preselected to complete the preconditioning of the flash welding operation. However, a description of the preselection of these parameters will be deferred until the overall flash welding operation is described in relation to FIGURE 2, which is a graph illustrating the various positions of the die face 40 with respect to stationary die face 38 with respect to time. With an understanding of the overall flash operation, it is felt that the preselection of the remaining parameters will be better understood.

At the beginning of the welding schedule, time is allotted for cleaning off foreign material from the faces 38 and 40 as mentioned hereinbefore. This interval of time corresponds to $t_1$ as shown in FIGURE 2. Preparatory to the welding operation, the workpieces 10 and 14 are placed against the preselected portion of space bar 42. Of course, the space bar 42 must be removed before the flash welding commences. However, it cannot be removed while the workpieces 10 and 14 are positioned adjacent thereto since it may bend these pieces while being retracted upwardly. Hence, movable platen 16 is rearwardly retracted typically one-quarter of an inch to permit the withdrawal of space bar 42. Time interval $t_2$ of FIGURE 2 corresponds to the one-quarter inch retraction of movable platen 16.

Just prior to the start of the flash welding operation, workpieces 10 and 14 must be approximately a few thousandths of an inch apart. Thus, after space bar 42 has been withdrawn, movable platen 16 must be moved forwardly one-quarter of an inch (corresponding to its prior retraction of one-quarter inch) plus a distance slightly less than the width of the preselected portion of the space bar. Since the space bar position has been preselected by the card reader, this preselected information can also be employed to control the amount of forward distance through which the platen 16 moves after it has come forward the one-quarter inch mentioned above.

After the platen 16 has been positioned, the workpieces 10 and 14 will be approximately a few thousandths of an inch apart. The platens themselves will be spaced from one another a distance equal to the initial die opening as indicated in FIGURE 2, the initial die opening having been achieved after a lapse of time $t_3$.

The flash welding operation may now commence. However, before it does, the operator generally cross-aligns workpieces 10 and 14. That is, workpieces 10 and 14 are generally sheets, the center lines of which may not necessarily be aligned. Thus the operator manually performs this cross-alignment operation by causing stationary platen 12 to move at a right angle to welder longitudinal center line.

When the cross-alignment operation is finished, the operator pushes an appropriate button to commence the flash welding operation. Current is supplied from welding current source 19 (see FIGURE 1) through transformer 21 to platens 12 and 16, which are in electrical contact with workpieces 10 and 14. Thus, an electrical arc is established between workpieces 10 and 14 which cause various layers of material to be burned off the workpieces 10 and 14 thereby insuring a high quality weld. During the flashing time, the platen 16 is moved toward stationary platen 12. The rate of movement is relatively slow during the initial portion of flashing time, as can be seen from FIGURE 2 where the flashing time interval $t_4$ is indicated. However, as the material is burned off, the rate of movement can be increased and this is done as shown in FIGURE 2. Preferably the law of movement during flashing time is either logarithmic or parabolic, as is well known. Various means have been employed to generate this type of law of movement in prior art devices. However, as will be brought out hereinafter, in this invention a mechanical cam operating a linear potentiometer is employed to produce an appropriate command flashing signal for an electro-hydraulic servo control system. Also, in accordance with this invention, a non-linear potentiometer may be employed, the non-linearity of which corresponds to the particular law of motion desired for a given welding schedule.

At the end of the flashing time $t_4$, the workpiece 14 is quickly moved into engagement with workpiece 10 while they are red hot to bring about the desired weld. The time during which this occurs is known in the art as the upset time and is shown as time $t_5$ in FIGURE 2. During upset, current is still supplied to workpieces 10 and 14 from source 19. The final position of movable platen 16 with respect to stationary platen 12 is termed the final die opening and is illustrated in FIGURE 2. As stated hereinbefore, the final die opening is pre-selected in accordance with the position of gauge bar 100. A timing circuit is provided in welding current source 19 to turn off the upset current shortly after the final die opening is attained.

Space bar 42 and gauge bar 100 respectively establish the initial and final die openings shown in FIGURE 2. Further factors which may be digitally preselected through card reader 52 are: (1) the secondary voltage by changing the turns ratio of the transformer 21 during flashing and upset times $t_4$ and $t_5$; (2) the electric power delivered to workpieces 10 and 14 during the flashing time $t_4$; (3) the electric power delivered to workpieces 10 and 14 during the upset time $t_5$; (4) the distance through which platen 16 moves during flashing time $t_4$; (5) the length of flashing time $t_4$; and (6) the length of time that current is supplied to workpieces 10 and 14 during upset time $t_5$.

As can readily be appreciated, there are many parameters which must be preselected for a given welding operation. Further, many of these parameters have a large number of values associated therewith. For instance, it is preferred that the flashing distance have one hundred different possible values. Thus with so many selections to be made by the operator, the probability of error and attendant production slow down increases. To minimize this probability, the control of the flash welding operation through a card reading apparatus is employed in this invention. Each welding schedule will have its own input card which may be used over and over again, as will be described in more detail with respect to FIGURE 10. This master card would be carefully prepared and verified and then duplicated. Hence the only discretion required on the part of the operator is to insure that the card corresponding to a desired welding schedule is selected. Each welding schedule could be assigned a number and then on each card would be conspicuously printed the number corresponding to a particular welding schedule. Hence if the operator were instructed that welding schedule fifty-four, for example, was required, the operator would then only have to select the card numbered 54 in order to insure proper selection of the welding schedule.

Figure 3:
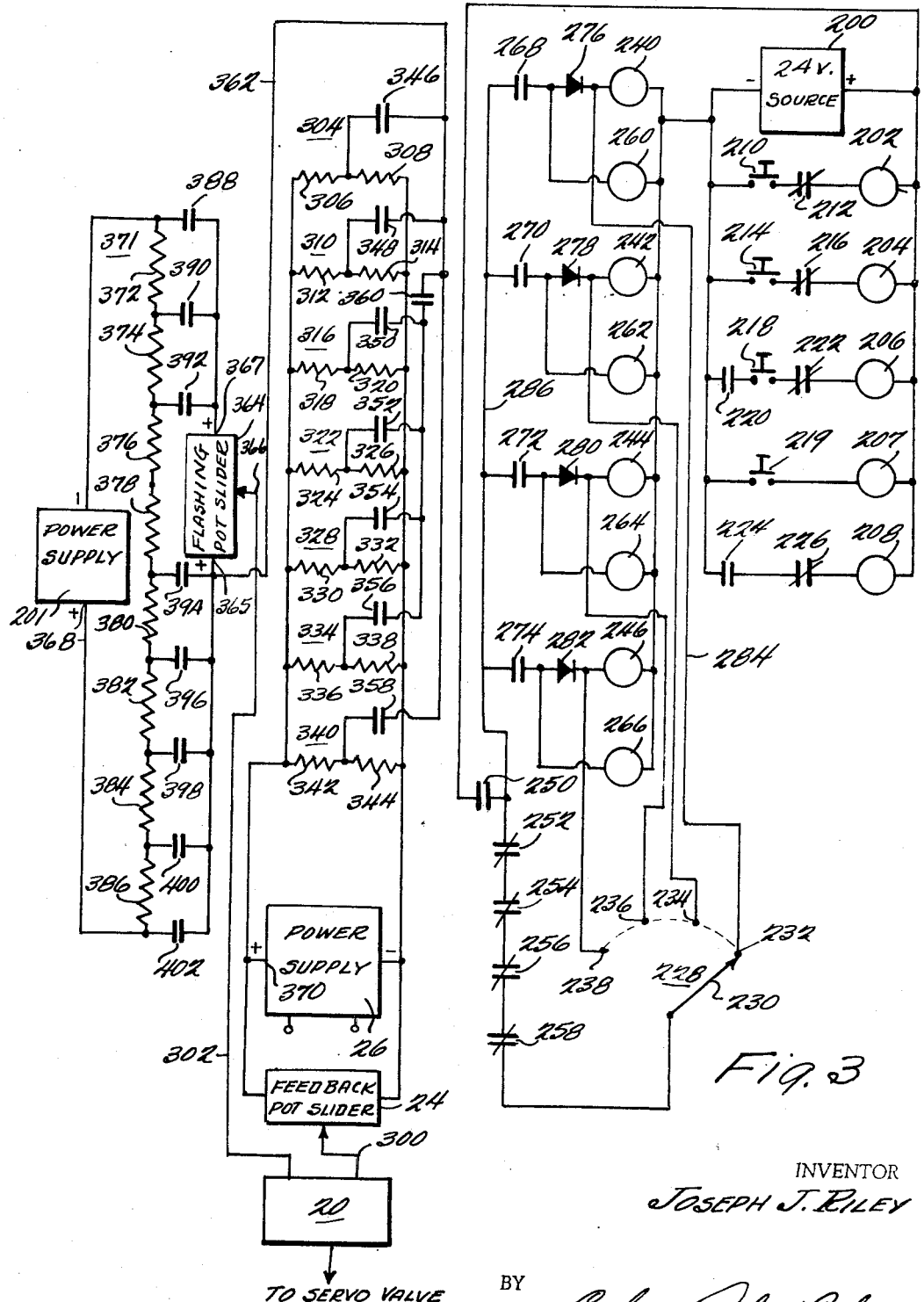
FIGURE 3 is a schematic drawing of the diagram of a simplified, typical control system in accordance with the invention.

Reference should now be made to FIGURE 3 which illustrates in detail the circuitry of the command signal source 18 of FIGURE 1. There is shown a power source 200 which typically is 24 volts D.C. Source 200 energizes die clean relay 202, retract relay 204, initial die position relay 206, and upset relay 208, all of these relays being connected in series with one another.

In series with die clean relay 202 are push button switch 210 and normally closed relay contacts 212 which are under the control of retract relay 204. Of course, it will be obvious to those having ordinary skill in this art that push button switch 210 may be replaced by any other type of suitable switch or a set of relay contacts and energized from another part of the system, if required in a particular application. The above also applies to other push putton switches which are mentioned in the following description of the invention.

In series with retract relay 204 are push button switch 214 and normally closed relay contacts 216, which are controlled by initial die position relay 206. In series with initial die position relay 206 are push button switch 218, normally open relay contacts 220, and normally closed relay contacts 222. Relay contacts 220 remain open until the space bar 42 of FIGURE 1 is retracted, these contacts being actuated by means (not shown) which could be a relay which is energized by a limit switch responsive to the rotation of the shaft of motor 44 so that the relay would be energized when the space bar 42 is fully retracted, thereby closing the contacts 220 and keeping them closed for the remainder of the welding operation. The contacts 222 are controlled by upset relay 208.

In series with upset relay 208 are normally open relay contacts 224 and normally closed relay contacts 226. Relay contacts 224 are closed at the beginning of upset time in response to the energizing of a relay 622 in the timing portion of the command signal generator 18, the timing portion being described in more detail hereinafter with respect to FIGURE 7.

An important aspect of this invention is that whenever the space bar position is selected under the control of card reader 52, as described hereinbefore with respect to FIGURE 1, the initial die opening or position is also selected. Referring to FIGURE 1, a multiposition switch 228 is shown on the shaft of motor 44. The armature 230 of switch 228 is connected to the shaft of motor 44, as shown in FIGURE 1. Switch 228 is provided with terminals 232, 234, 236, and 238, corresponding to the four possible selections of the initial opening. Of course, the number of terminals of switch 228 is arbitrary and it will depend on the number of different initial die openings desired. As described hereinbefore, the final position of space bar 42 corresponds to the final angular position of the shaft of motor 44. Thus terminals 232–238 respectively correspond to portions 55–61 of space bar 42.

Reference should now be made to FIGURE 3 which shows the four position switch 228 of FIGURE 1. Voltage source 200 is connected to one of parallel relays 240, 242, 244, and 246 through switch 228, depending on the position of the armature 30. Relays 240–246 are respectively associated with the available initial die openings, as will be more apparent hereinafter. Connected in series with switch 228 are normally open relay contacts 250 and normally closed contacts 252–258. Relay contacts 250 are closed during space bar positioning and remain closed thereafter. Relays 260–266, which are respectively associated with relays 240–246, respectively control contacts 252–258. Normally open relay contacts 268–274 and diodes 276–282 are respectively associated in series with relays 240–246. Thus if switch 228 is in the position shown in FIGURE 3, relay 240 will be energized over line 284 from voltage source 200, thereby closing contacts 268 and permitting relay 240 to be energized over line 286. Diode 276 which prevents the energization of relay 260 from line 284 is energized from line 286 and therefore normally closed relay contacts 252 are opened. Thus once the initial die opening corresponding to terminal 232 of switch 228 is selected as described above, this selection remains fixed until the end of the current welding operation even if the armature 230 is rotated away from terminal 232 because of subsequent energization of space bar position 44. This is an interlock feature to prevent misoperation.

The servo amplifier 20 of FIGURE 1 is shown with two input lines 300 and 302 which respectively correspond to the command signal line from source 18 and the feedback signal line from potentiometer 24 of FIGURE 1, the power supply 26 of FIGURE 1 also being shown, this supply typically delivering 0 to 48 volts D.C. Power supply 26 is the ultimate source of the various command voltages which respectively correspond to the various relative positions of the plates 12 and 16 during a welding schedule. The various voltage dividers are grouped corresponding to various functions thereof, as follows: voltage divided 304 comprising resistors 306 and 308 and corresponding to the die cleaning command voltage; voltage divider 310 comprising resistors 312 and 314 and corresponding to the retract position; voltage divider 316 comprising resistors 318 and 320 and corresponding to the initial die position associated with terminal 232 of switch 228; voltage divider 322 comprising resistors 324 and 326 and corresponding to the initial die position associated with terminal 234; voltage divider 328 comprising resistors 330 and 332 and corresponding to the initial die position associated with terminal 236; voltage divider 334 comprising resistors 336 and 338 and corresponding to the initial die position associated with terminal 238; and voltage divider 340 comprising resistors 342 and 344 and corresponding to the upset position. The voltage divider circuits are all energized from power supply 26.

The particular voltage divider selected depends on which one of the normally open relay contacts 346, 348, 350, 352, 354, 356, and 358 is closed, relay contacts 346–358 being respectively associated with voltage dividers 304–340.

Normally open relay contact 360 is closed whenever one of the initial die positions is to be established. Contacts 346, 348, 360, and 358 are respectively closed when relays 204–208 are energized, while relay contacts 350–356 are respectively closed whenever relays 240–246 are energized. Thus depending on which one of the relay contacts 346–360 is energized, a command voltage is applied over line 362 through flashing potentiometer 364 and line 302 to servo amplifier 20.

The voltage across terminals 365 and 367 of flashing potentiometer 364 is provided from power supply 201, which typically has a value of 24 volts. Preferably power supply 201 is well regulated to insure accuracy of the flashing potentiometer voltage. This voltage may be preselected and thereby the distance that the movable platen moves during the flashing time may be adjusted. To accomplish this, series resistors 372, 374, 376, 378, 380, 382, 384, and 386 are provided. Respectively associated with resistors 372–376 are normally open relay contacts 388–392, and relay contacts 394–402 are respectively associated with resistors 378–386. One of relays 388–392 will be selected in accordance with information punched into a card fed to card reader 52 of FIGURE 1, the selected relay providing a coarse setting of the flashing distance required for a particular welding schedule. Further information punched into the card fed to the card reader will close one of the contacts 394–402, thereby providing a fine setting of the required flashing distance. Although only three coarse and five fine selections are shown, it will of course be obvious to those of ordinary skill in this art that the number of selections may be increased or decreased, depending on the requirements of the situation. Typically, ten coarse selections are provided varying between 0.2 inch and 1.3 inches in 0.1 inch steps. Further, ten fine selections are also provided varying between 0.01 inch and 0.1 inch in 0.01 inch steps.

Terminals 368 and 370 of power sources 20' and 26 respectively have positive polarities. Thus when the slider 366 of potentiometer 364 is at lowermost position, no voltage is subtracted from the signal applied over line 362 to line 302. However, during flashing time the slider 366 moves toward the negative terminal of potentiometer 364, thereby decreasing the voltage applied from line 362 and decreasing the distance between the workpieces 10 and 14 of FIGURE 1 in accordance with the special law of movement discussed hereinbefore. Since the maximum voltage which can be subtracted from the signal on line 362 is determined when the wiper 366 is in its uppermost position, it follows that the flashing distance is established by the voltage across potentiometer 364 and therefore the selection of relays 388–402 determines the flashing distance.

Having now described in detail most of the command signal source 18 of FIGURE 1, the details of welding current source 19 of FIGURE 1 will be described with respect to FIGURES 4–6. After this description, the remaining portion of command signal source 18, which controls the timing of the various events of the welding schedule, will be described.

Figure 4:
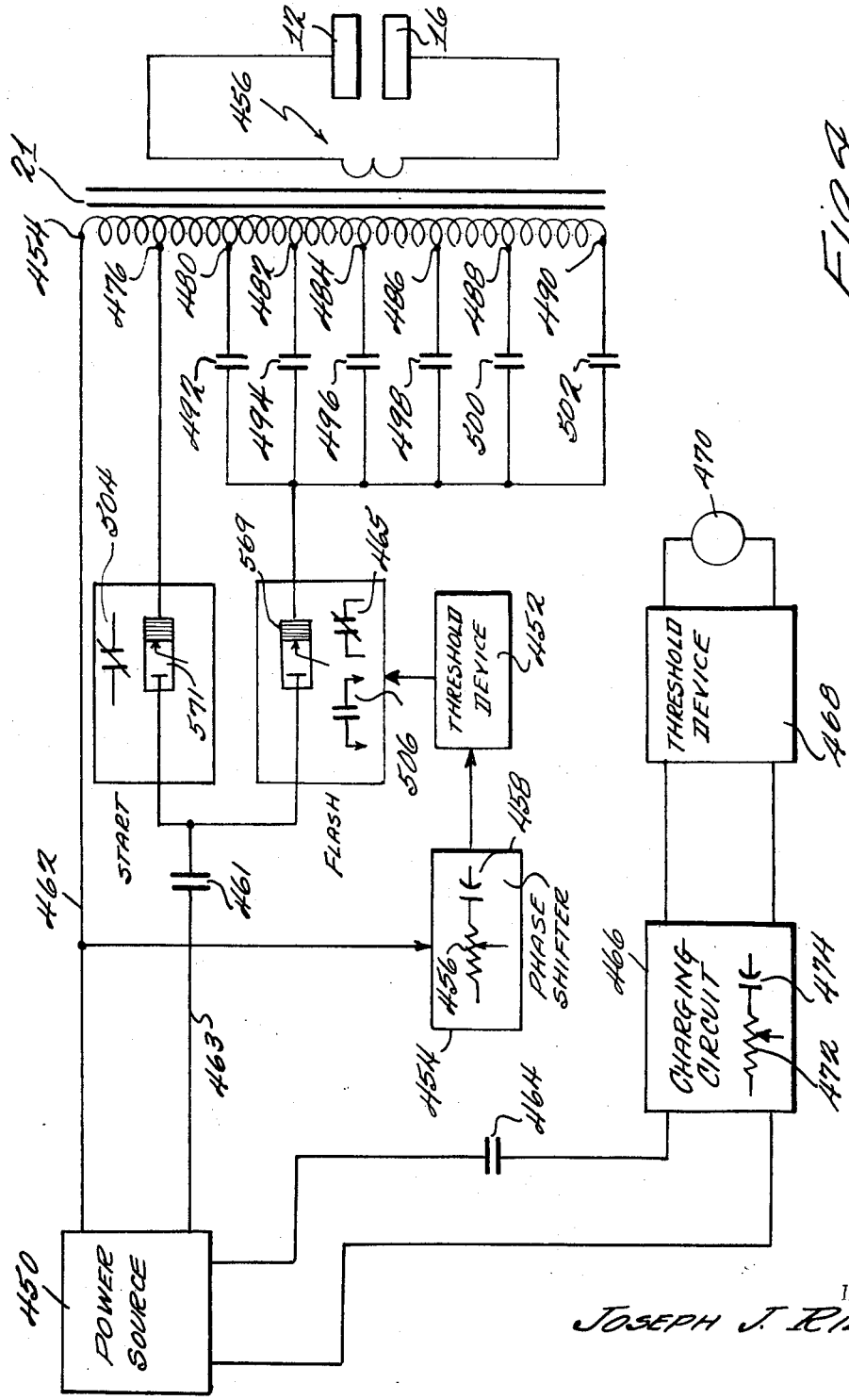
FIGURE 4 is a partial schematic and block diagram of the welding transformer together with circuitry for changing the turns ratio to select the desired secondary voltage. Also shown are means for controlling the flashing and upset heat control and the upset current time.

Referring to FIGURE 4, there is shown a power source 450 connected to a threshold device 452 which controls the amount of power delivered to the primary winding 455 of transformer 21. The secondary winding 456 of the transformer is connected to platens 12 and 16, these being diagrammatically indicated in FIGURE 4 but shown with more specificity in FIGURE 1. Threshold device 452 controls the electrical power or heat delivered to the transformer 21 and thereby controls the amount of heat applied to the workpieces during the welding operation.

Threshold device 452 will be described in more detail hereinafter with respect to FIGURE 5 which illustrates how the applied heat is controlled during both the flashing and upset times. Typically the threshold device is a thyratron or silicon control rectifier which in turn controls an ignitron 569, the ignitron being in series with line 463 and being fired when the threshold associated with the thyratron or SCR is exceeded. Typically a pair of ignitrons are provided to control both polarities of the power signal on line 463. However, only ignitron contactor 569 is shown to simplify the description of this portion of the invention. Ignitron contactor 571 conducts during a first time interval of the flashing portion of the welding schedule whenever normally open relay contacts 504 are closed. A phase shifting network 454, which is responsive to power source 450, applies the triggering waveform to the thyratron or SCR. Typically, phase shifter 454 includes a potentiometer type resistive network 456, which is diagrammatically shown as a potentiometer, and a capacitor 458. The actual value of R with respect to the value of C determines the phase shift provided by phase shifter 454. Typically phase shifter 454 shifts the line voltage occurring on lines 462 so that the firing of the ignitron of threshold device 452 is delayed until the phase-shifted line voltage has reached a predetermined amplitude. Thus only a portion of each cycle of the line voltage is passed, this portion corresponding to the amount of power delivered to the platens 12 and 16. To vary the power or the heat supplied to the workpieces, all that is necessary is to adjust the value of resistive network 456 as will be described in more detail hereinafter with respect to FIGURE 5.

To prevent the application of upset current to transformer 21 after the platen 16 has moved to the final die position, normally closed relay contacts 465 are provided, these contacts opening shortly after the upset time is completed and keeping ignitron contactor 569 from conducting. Normally open relay contacts 464 connect power source 450 to charging circuit 466 which, in turn, is connected to threshold device 468, the threshold device including either a thyratron or a silicon control rectifier (SCR). Connected to threshold device 68 is a relay 470 which opens contacts 465 when energized. Charging circuit 466 includes a potentiometer type resistive network 472 and a capacitor 474. When relay 464 is closed, charging circuit 466 commences to charge towards the threshold value of threshold device 468, the amount of time required for this being determined by the time constant of the RC combination including resistive network 472 and capacitor 474. When the threshold value is exceeded, the thyratron of threshold device 468 is turned on, thereby energizing relay 470, which in turn causes contacts 465 to open and thereby remove application of power to welding transformer 21. The combination of 466 and 468 is commonly referred to as an upset current timer. Relay contacts 464 are closed when the upset time commences and thus the time constant of the charging circuit 466 is chosen so that the current to transformer 21 is turned off shortly after the platen 16 reaches the final die opening. Relay contacts 464 are controlled from timing apparatus within the command signal source 18 of FIGURE 1, this timing apparatus being described in more detail hereinafter with respect to FIGURE 7.

The effective turns ratio of the transformer 21 may also be varied in accordance with information punched in the cards fed to the card reader 52 of FIGURE 1. A plurality of taps 476–490 are provided on the primary winding 454 and magnetic contactors' contacts 492–502 are respectively connected to taps 480–490, these magnetic contactor contacts being normally open and one of them being closed in response to the energization of appropriate relay at card reader 52 of FIGURE 1. The magnetic contactors' contacts are illustrated by way of description. They can be replaced by a powerized multi-position tap switch (not shown). The normally closed contacts 504 and the normally open contacts 506 are both controlled by a relay in the timing portion of the command signal source 18 of FIGURE 1 serving to de-energize ignitron contactor 571 and energize contactor 569. The timing portion will be described in more detail hereinafter with respect to FIGURE 7. Thus during a first portion of the flashing interval, the effective turns ratio of transformer 21 is determined by the location of tap 476. At the end of the first portion of the flashing interval, the timing unit opens contacts 504 and closes contacts 506 to energize one of the tap positions 480–490, the selected tap depending on which of the contacts 492–502 have been closed. Thus during a second portion of the flashing interval, which commences after the end of the above-mentioned first portion, the effective turns ratio of the transformer 21 is changed.

Thus in summary with respect to FIGURE 4, four parameters of the welding schedule have been described and the manner by which selected values of these parameters can be specified has also been discussed; these parameters being (1) the turns ratio of transformer 21, (2) the amount of heat supplied during flashing time, (3) the amount of heat supplied during upset time, and (4) the length of time that current is applied during upset.

Figure 5:
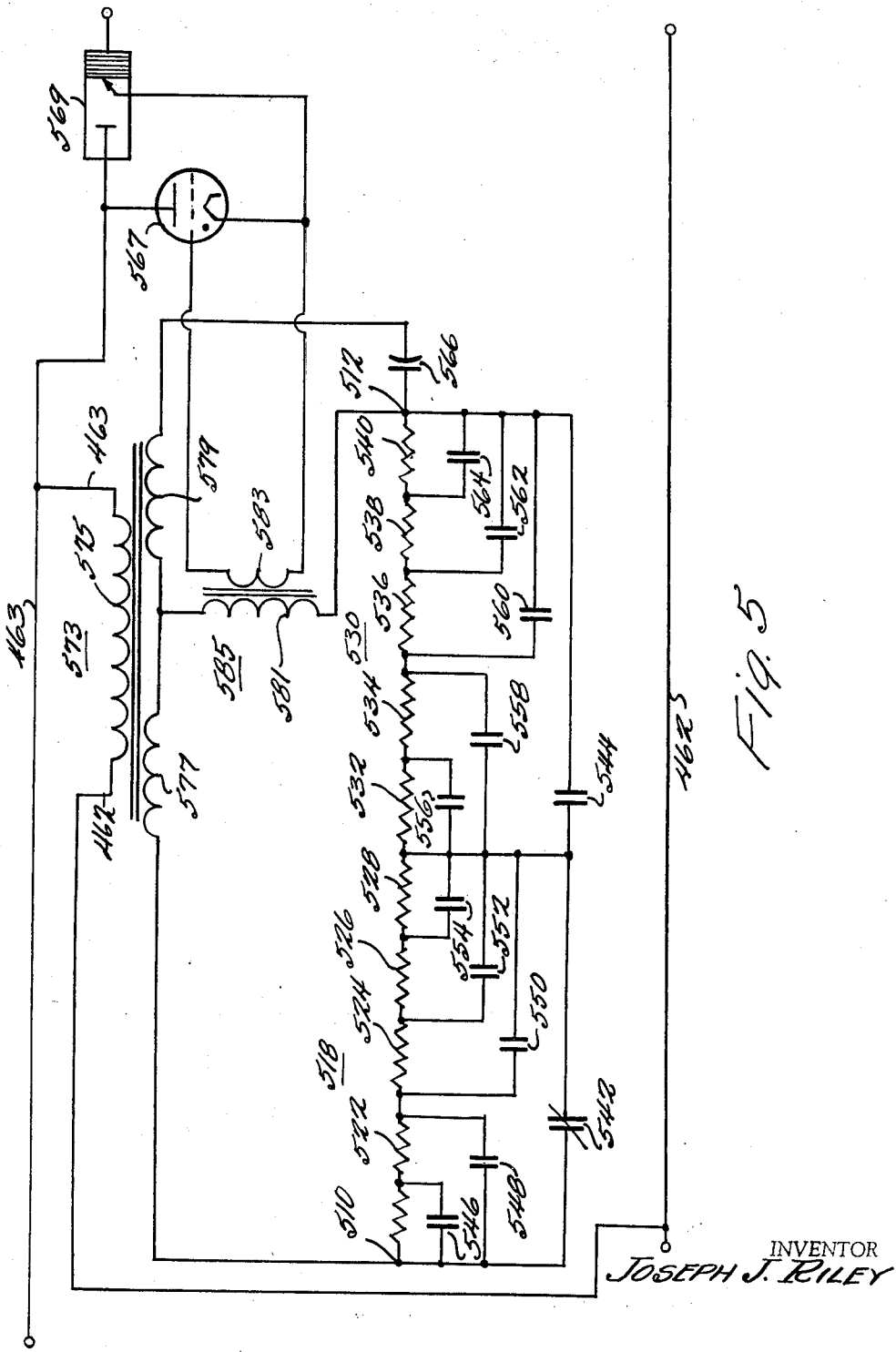
FIGURE 5 illustrates in more detail the flash and upset heating control which are broadly shown in FIGURE 4.

Referring to FIGURE 5, there is shown in more detail the phase shifting circuit 454 and threshold device 452 of FIGURE 4; the circuitry of FIGURE 5 is, however, quite simplified with respect to that actually employed. However, enough has been shown to indicate the operation and illustrate the invention. Lines 462 and 463 of FIGURE 4 are shown. Resistive network 518, comprising resistors 520–528, controls the amount of phase shift during upset time and resistive network 530 comprising resistors 532–540 controls the phase shift during the second portion of the flashing interval. Relay contacts 542 and 544 are respectively normally closed and normally open, both of these relays being controlled by the timing portion of the command signal generator 18 of FIGURE 1, which will be described in more detail hereinafter with respect to FIGURE 7. Relay contacts 546–554 are respectively associated with resistors 520–528. Further, resistors 520 and 522 provide coarse control over the phase shift during upset time while resistors 524–528 provide fine control. Contacts 546–554 are energized by relays (not shown) in card reader 52 of FIGURE 1 in accordance with the information punched on a card fed to the card reader, this being described in more detail with respect to FIGURE 10. Depending on which one of the contacts 546 and 548 is closed, the appropriate amount of coarse control over the phase shift during upset time will be provided and depending on which one of the contacts 550—554 is closed, the appropriate amount of fine control will be provided over the phase shift.

Relay contacts 556–564 are respectively associated with resistors 532–540. Resistors 532 and 534 provide coarse control over the phase shift during flashing and resistors 536–540 providing fine control over the phase shift during this time. Contacts 556–564 are also energized by relays (not shown) in the card reader 52 in the manner described hereinbefore with respect to contacts 546–554. When the relay contacts 542 and 544 are respectively closed and opened as shown in FIGURE 5, the voltage applied to the phase shifting network 454 across terminals 510 and 512 is shorted around network 518 by closed relay contacts 542 and through network 530, depending on which of the contacts 556–564 are closed. Assuming contacts 556 and 562 are closed, the imput signal will be applied from lines 462 and 463 through transformer 573 which includes primary 575 and secondaries 577 and 579 to resistors 534 and 536 before being applied to capacitor 566, thyratron 567, and ignitron contactor 569. Since the phase shift of the primary 581 and secondary 583 of transformer 585 with respect to lines 462 and 463 may be varied by varying resistance, the ignition of the ignitron contactor 569 with respect to the voltage on lines 462 and 463 may also be varied.

When the timing portion of the command signal source 18 of FIGURE 1 signals that the flashing interval is completed and that upset should commence, a relay 622 of FIGURE 7 is energized opening contacts 542 and closing contacts 544. The input signal across terminals 510 and 512 will then pass through network 518 and bypass network 530 through contacts 544. It can now be seen that the degree of phase shift (reduction in RMS voltage on the welding transformer primary 454) during upset time is independently selected from the degree of voltage reduction during flashing and therefore different amounts of heat can be applied to the workpieces 10 and 14 during these different time intervals of the welding schedule.

Referring to FIGURE 6, there is shown in detail the charging circuit 466, the threshold device 468 and relay 470 of FIGURE 4. Resistor network 570 comprising resistors 572, 574, and 576 has respectively associated therewith relay contacts 578, 580, and 582. These relay contacts are normally open and one of them is closed in accordance with the energization of a corresponding relay in card reader 52 in a manner which has been described hereinbefore with respect to other resistors networks, such as network 518 of FIGURE 5. Also provided are capacitors 584 and resistor 586. The time constant of the RC circuit comprising resistor 570 and capacitor 584 may be varied in accordance with which of the contacts 578–582 is closed. When contacts 464 are open, charging current for capacitor 584 passes from terminal 587, which is assumed to be positive at the moment under consideration through capacitor 584, resistor 586, the grid-cathode path of thyratron 468 (this later path acting as a rectifier), and resistor 589 back to terminal 591. Capacitor 584 charges with the polarities shown in FIGURE 6. When contacts 464 close, the charging stops as the cathode of thyratron 468 and terminal 587 are at the same potential. At this time the grid of thyratron 468 is negative with respect to the cathode. The capacitor starts to discharge through the shunting resistor network 570. When capacitor 584 is sufficiently discharged, the thyratron 468 conducts, the moment of conduction being in part synchronized with the superimposed AC voltage from power source 450 occurring across calibrating potentiometer 593. When thyratron 468 conducts, relay 470 is energized thereby opening contacts 465. Thus the amount of time required to reach the threshold of thyratron 468 is variable and therefore the amount of time upset current is applied to welding transformer 21 is also variable, this having been described in more detail hereinbefore with respect to FIGURE 4.

Referring to FIGURE 7, there is pictorially shown the portion of the command signal source 18 of FIGURE 1 which controls the timing of various events of the welding schedule and which generates the flashing curve, discussed hereinbefore. A variable speed D.C. motor 600 is provided together with a gear box 602 for driving shaft 604. Rather than a variable speed D.C. motor, a mechanical speed variator or a variable frequency AC motor may also be employed. Mounted on shaft 604 are four cams 606–612. The shaft is anchored at its far end by journal means 614. Respectively associated with cams 606–610 are limit switches 616–620 and relays 622–626. Power source 628 is connected to relays 622–626. Cam 12 generates the flashing curve—that is, this cam determines the law of movement of slider 366 of potentiometer 364, see FIGURE 3. The relation of the cam 612 to linear potentiometer 364 will be described in more detail hereinafter with respect to FIGURE 8.

When the lobe of cam 606 engages limit switch 616, relay 622 is energized from power source 628. The energization of relay 622 signals the end of the flashing interval and the beginning of upset. Thus at this time contacts 224, see FIGURE 3, are closed thereby energizing upset relay 208 which, in turn, causes contacts 358 to close which in turn allows the command signal from voltage divider 340 to be applied to servo amplifier 20. Also upon the energization of relay 622, contacts 542 and 544 of FIGURE 5 are respectively opened and closed, thereby switching the phase shift control over to the upset portion 518 of the phase shifter 454 and thereby providing the heating power required during upset. Further, upon energization of relay 622, contacts 464 of FIGURES 4 and 6 close, thereby initiating the timing interval of circuit 466.

When the lobe of cam 608 contacts and closes limit switch 618, relay 624 is energized from power source 628. The energization of relay 624 causes the turns ratio of the welding transformer 21 to be changed as described hereinbefore with respect to FIGURE 4. When the lobe of cam 610 contacts and closes limit switch 620, relay 626 is energized from power source 628, the purpose of this being to allow the unit to run at a preselected speed so that stopping by dynamic braking (not shown) will be accurate. This expedient is well known to those skilled in the flash welding art.

As stated hereinbefore, motor 600 is of the variable speed type. Thus the length of the flashing interval may be varied in accordance with the motor speed. That is, the amount of time it takes shaft 604 to complete one revolution will determine the length of time of the flashing interval 604 and the start of upset time as can be seen from FIGURE 7. The speed of variable speed motor 600 is dependent upon the magnitude of the D.C. voltage applied to its armature. Diagrammatically indicated in means 629 is a potentiometer type resistive network 631 from which the variable D.C. voltage is derived. Variable speed D.C. motors, which fulfill the above requirements, are commercially available. An appropriate motor and control would be manufactured by Reliance Electric and Engineering Co., Type V-S Junior-Style SCRF. This motor and control would be modified in accordance with the present invention so that the potentiometer (which supplies the variable D.C. voltage for the motor) would be replaced by a resistor network such as resistor network shown in FIGURES 12-14, thereby permitting remote digital selection of the motor speed from the card reader 52 of FIGURE 1.

FIGURE 11 illustrates the fundamental potentiometer circuit 800 which connects the control circuit of the motor to voltage source 802. FIGURE 12 illustrates how the potentiometer circuit of FIGURE 11 must be modified to permit digital selection of the motor speed while at the same time maintaining constant loading of the voltage source 802. In FIGURE 12 resistive elements 806 and 808 are shown together with terminals A, B, and E and lines C and D. Terminals A, B, and E are analogous in FIGURES 11 and 12.

In FIGURE 13, there is shown the resistive network equivalent of the circuit of FIGURE 12. Resistive chain 810 of FIGURE 13 is the equivalent of resistive element 806 of FIGURE 12 and provides a coarse selection of the variable speed control signal applied to the motor. Resistive chain 812 of FIGURE 13 is the equivalent of resistive element 808 of FIGURE 12 and provides a fine selection of the variable speed control signal. Terminals A, B, and E and lines C and D of FIGURE 12 also have their counterparts in FIGURE 13. Resistor chain 810 comprises six (for example) resistors 814-824, each of the resistors having a value R. The reason for assigning these resistors the value R will be explained hereinafter. Normally open relay contacts 826 and 828 are actuated by a single relay (not shown) in card reader 52 of FIGURE 1. The same respectively applies to relays 830 and 832, relays 834 and 836, relays 838 and 840, and relays 842 and 844. Thus, whenever any one of the relays of card reader 52 associated with coarse resistor chain 810 is energized, a resistance having a value of 2R is presented to resistor chain 812 as can be seen from an inspection of FIGURE 13.

Resistor chain 812 includes resistors 846-856 and associated relay contacts 858-868, these contacts being respectively associated with six relays (not shown) in card reader 52 of FIGURE 1. As indicated in FIGURE 13, the values of resistors 846-856 are R/3. Thus, the total value of resistance of resistors 846-856 is 2R. As pointed out above, chain 810 presents a resistance having a value of 2R to chain 812 regardless of which of the relays associated therewith is energized. Hence, the total value of resistance across lines C and D remains a constant value of R. Hence the loading of voltage source 802 remains constant. This holds true regardless of which of the relays respectively associated with chains 810 and 812 are energized. Generally speaking, it is necessary that the sum of the resistors in the chain 812 equal the value of N of the resistors of the chain 810, assuming that chain 810 presents N resistors to chain 812 when the relay in card reader 52 associated with chain 810 is energized.

Referring to FIGURE 8, the relationship between mechanical cam 612 and potentiometer 364 is shown in more detail, a roller 630 engages the surface of cam 612, a spring 632 being provided to maintain the roller against the cam surface. The slider or wiper 366 moves in and out of the linear potentiometer 364. Guide 634 (shown in cross-section) is provided to take the strain off the slider 366. Thus as the cam 612 rotates, the slider 366 will follow the cam surface, thereby providing the command signal corresponding to the desired law of movement for the movable platen 16 during the flashing interval.

Referring to FIGURE 9 an alternative embodiment to that shown in FIGURE 8 is illustrated. In this embodiment a rotary, non-linear potentiometer 640 is non-rotatably or fixedly mounted with respect to rotating shaft 604 of motor 600. Connected to shaft 604 is a wiper 642 which is electrically insulated from the shaft 604 while at the same time being connected to electrical wire 644 by an appropriate slip ring connection (not shown). One end of the non-linear potentiometer is connected to wire 646. The other end is connected to line 645. Thus as the angular position of shaft 604 linearly varies with respect to time, a non-linear voltage, such as a logarithmic or parabolic variation, is generated on lines 644 and 646 due to the non-linear variation of resistance along the length of the potentiometer 640. The lines 644, 645, and 646 would be respectively connected to line 302 and terminals 365 and 367 of FIGURE 3.

Figure 10:
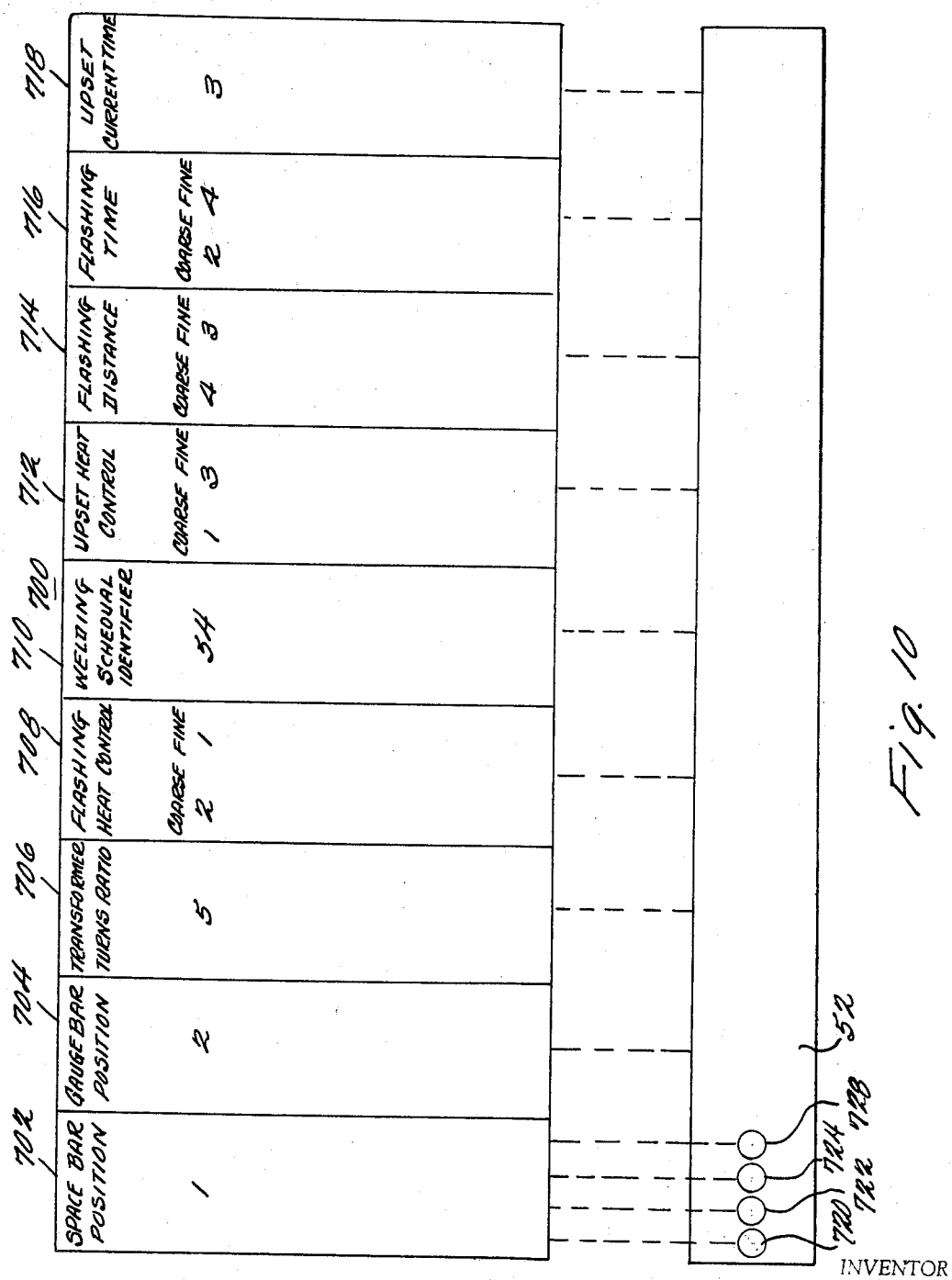
FIGURE 10 shows an illustrative embodiment of a punched card punched with information relating to the values of the various parameters which must be selected for a particular welding schedule.

Reference should now be made to FIGURE 10 which shows a punched card 700 punched with information relating to the values of the various parameters which must be selected for a particular welding schedule. Card 700 diagrammatically represents the type of punch card which would be fed into card reader 52 of FIGURE 1, the card reader 52 also being diagrammatically indicated in FIGURE 10. Of course other digital data processing apparatus may be employed. For example, the information provided on card 700 could also be provided on paper or magnetic tape or a piece of paper in conjunction with optical scanning means could also be employed. Further, card reader 52 could also be replaced by tape readers, typewriters, or other types of digital data input processing equipment.

Card 700 is divided into portions 702-718, which are respectively associated with the information shown in FIGURE 10. Thus portion 702 corresponds to the space bar position, portion 704 corresponds to the gauge bar position, etc. Referring to the space bar position portion 702 of card 700, it is there indicated that the number one has been punched into the portion 702. Portion 702 is connected to relays 720-728 of card reader 52. These relays are respectively associated with contacts 54-60 of FIGURE 1. Thus assuming that when the number one is punched in portion 702, the relay 728 will be energized. This causes contact 54 to close in FIGURE 1. Thus it can now be seen how digital information punched in card 700 can influence the setting of relay contacts described hereinbefore with respect to the description of the invention in FIGURES 1-9 and 11. Thus portions 704-708 and 712-718 exert a like influence on their respective contacts which have been described hereinbefore.

Portion 710 is set aside to identify the particular welding schedule punched in on card 700. As stated hereinbefore, the only discretionary act imposed upon the operator is to select the proper punched card corresponding to the desired welding schedule. Hence, if the operator is instructed that the welding schedule corresponding to card 54 is to be performed, his only task is to place the card in the card reader after selecting it. In portions 708 and 712-716, two numbers are shown, these numbers corresponding to the coarse and fine selections associated with the flashing heat control, upset heat control, etc.

Having now described the overall structure of the system, the operation thereof will now be described. Referring to FIGURE 3, the operator depresses push button 210 thereby energizing die cleaning relay 202 which in turn causes contacts 346 to close. At this time flashing potentiometer slider 366 is at its lowermost position (see FIGURE 3) and therefore the command signal from voltage divider 304 is applied over line 302 to servo amplifier 20. Referring to FIGURE 1, there will be a difference in magnitude between the command signal from source 18 and the signal from feedback potentiometer 24. Thus servo valve 32 is actuated causing piston 36 to move the platen 16 a distance away from a platen 12 corresponding to the distance A shown on space bar 42. Resistors 306 and 308 of voltage divider 304 are so chosen as to insure this positioning of the platen 16 with respect to stationary platen 12. When this position is attained, the voltage applied from potentiometer 24 equals the voltage provided by voltage divider 304 and therefore the servo system becomes inactive.

At this time the workpieces 10 and 14 are not clamped into platens 12 and 16. The space bar 42 is then lowered between platens 12 and 16 under the control of motor 44 thereby cleaning the faces 38 and 40 of the platens. At the bottom of the downward movement of space bar 42 a limit switch (not shown) is engaged which causes the movement of the space bar to reverse and move upwardly, the spacebar stopping at a preselected position so that the workpieces 10 and 14 can be clamped into the platens 12 and 16 and at the same time be positioned with respect to one another in accordance with the thickness of the workpieces to be welded. As hereinbefore stated, portions 55-61 respectively correspond to different thicknesses of the workpieces (for example, sheets of metal) to be welded. Thus referring to FIGURE 10, the number one has been punched into card 700 thereby energizing relay 720 which closes normally open contact 54 shown in FIGURE 1. When the lobe of cam 70 causes switch 78 to open, relay 88 will be de-energized, thereby opening normally open contact 92 and de-energizing motor 44 and thereby stopping the space bar at the appropriate position.

After the workpieces 10 and 14 have been clamped adjacent the portion 61 of space bar 42, the movable platen 16 is retracted approximately one-quarter inch to permit the upward retraction of space bar 42 while at the same time not damaging the edges of the workpieces 10 and 14. The retraction of movable platen 16 takes place when push button 214 of FIGURE 3 is depressed by the operator thereby energizing retract relay 204 which opens normally closed contact 212 and closes normally open contact 348. Hence die cleaning relay 202 is de-energized and voltage divider 310 is applied to servo amplifier 20 of FIGURE 1. The values of resistors 312 and 314 are such that the voltage provided by voltage divider 310 is enough greater than the voltage supplied by 304 so as to cause the platens to be one-quarter inch further apart than they are during the die cleaning operation.

After the space bar 42 is removed, contact 220 is closed as hereinbefore described. The operator then pushes the initial die position push button 218 thereby energizing relay 206, which in turn opens contacts 216 and closes contacts 360. Hence, the retract relay 204 is de-energized and the signal from voltage dividers 316-334 is applied over line 302 to servo amplifier 20. As described hereinbefore, the selection of the initial die position is automatically made when the space bar position is established. Thus if the portion 61 of space bar 42 is selected by the number one punched on the portion 702 of the card 700 of FIGURE 10, then the switch 228 of FIGURE 3 will be in the position shown in the drawing. Thus, the relay 240 of FIGURE 3 will be energized when contact 250 closes, the operation of contact 250 having been described hereinbefore. Thus contacts 350 are closed and voltage divider 316 applies a signal over line 302 which brings the movable platen 16 back through the one-quarter inch which is retracted for removal of the space bar 42 and through another distance approximately equal to the width of the portion 61 of space bar 42. The width of the portion 61 of space bar 42 is indicated at B in FIGURE 1. At this time, the workpieces 10 and 14 are approximately a few thousandths of an inch apart preparatory to flashing. Before flashing commences, the operator cross-aligns the workpieces 10 and 14 as described hereinbefore.

Referring to FIGURE 3, the operator next depresses push button 219 to initiate flashing. Relay 207 is energized thereby closing normally open contacts 461 associated with the ignitron contactors 569 and 571 of FIGURE 4 and normally open contacts 633 of FIGURE 7. Thus primary voltage is applied to welding transformer 21 simultaneously with the initiation of the rotation of shaft 604 of motor 600, see FIGURE 7. During a first portion of the flashing interval the turns ratio of welding transformer 21 is determined by the position of tap 476 on the primary winding of transformer 21 since contact 504 in the start ignition contractor 571 is closed. During the flashing interval, cam 608 will engage limit switch 618, thereby energizing relay 624, see FIGURE 7. Thus the turns ratio of transformer 21 is changed during the flashing interval, in accordance with which one of the contacts 492-502 has been closed, this in turn being established by the number punched into portion 706 of card 790, see FIGURE 10. The energization of relay 624 of FIGURE 7 opens contacts 504 and closes contacts 506 as described hereinbefore to permit the change in the turns ratio of transformer 21 through switching from ignitron contactor 571 to ignitron contactor 569.

The slider 366 of the flashing potentiometer 364 follows the surface of cam 612 as shown in FIGURE 8. When the rotation of shaft 604 of FIGURE 7 begins, the slider 366 is at the lowermost portion of potentiometer 364, see FIGURE 3. Thus the initial die opening signal applied from voltage divider 316 to line 302 has its value unchanged at the beginning of the flashing interval. However, as shaft 604 rotates, an increasingly large negative signal is added to the initial die opening signal thereby decreasing the value thereof and further causing the workpieces 10 and 14 to move together during flashing. As described hereinbefore, the rate of movement of movable platen 16 with respect to stationary platen 12 is relatively slow during the first portion of the flashing interval. However, as material is burned away from the workpieces, the rate of movement can be and is increased, this resulting from the shape of the surface of cam 612, as shown in FIGURE 8.

When the flashing interval is completed the lobe of cam 606 of FIGURE 7 contacts and closes limit switch 616, thereby energizing relay 622 from power source 628. This, in turn, closes normally open relay contact 464 of FIGURES 4 and 6, opens normally closed contacts 542 of FIGURE 5, closes contacts 544 of FIGURE 5, closes normally open contacts 224 of FIGURE 3, and closes normally open upset valve contacts 35 of FIGURE 1.

The closure of contacts 224 causes the initial die relay 206 to be de-energized and the upset relay 208 to be energized which, in turn, causes contact 358 to be closed, thereby placing the upset command voltage on line 302 which is connected to the servo amplifier 20. The resistors 342 and 344 of upset voltage divider 340 are so chosen that the signal applied from the voltage divider corresponds to a distance between platens 12 and 16 which is impossible to attain. That is, the final die opening is established by the portions 104-110 of gauge bar 100 which is adjacent upset nut 102. The command voltage given to servo amplifier 20 from voltage divider 340 is so small that it corresponds to a distance less than the final die opening. Thus when the upset nut 102 moves into engagement with the surface of portion 110 (for example) of gauge bar 100, an error signal will still be present on line 30. This is done to insure that the servo valve aids the upset valve 33 during upset, the upset valve being energized by the closure of normally open contacts 35. Contacts 35 are closed when the relay 633 of FIGURE 7 is energized as stated above. The upset valve 33 is thrown into the hydraulic system during upset time so that the welded pieces may be rammed together at the end of flashing to secure a good weld therebetween. The signal provided by voltage divider 340 is so chosen as to account for the fact that the slider 366 of potentiometer 364 will be in its uppermost position as seen in FIGURE 3.

The energization of relay 622 closes contacts 544 and opens contacts 542 of FIGURE 5, thereby switching resistive network 518 into operation. This results in a different amount of heat being applied to the workpieces during upset, as described herebefore with respect to FIGURES 4 and 5.

The energization of relay 622 of FIGURE 7 also closes contacts 464 of FIGURES 4 and 6, thereby initiating timing interval during which current is delivered to welding transformer 21. The timing interval is so chosen that relay 470 is energized shortly after the upset nut 102 contacts the surface of portion 110 of gauge bar 100, see FIGURE 1, thereby turning off the upset current.

At the end of upset, cam 610 contacts and closes limit switch 620, thereby energizing relay 626 so that the motor 600 can run at a preselected speed thereby allowing the motor to be stopped by dynamic braking so that the stopping will be accurate. Dynamic braking techniques for accomplishing this are not shown; however, they are well known to those having ordinary skill in the flash welding art. After the motor 600 has stopped, the angular position of shaft 604 of FIGURE 7 will be such that the wiper 366 of potentiometer will be at its lowermost position, see FIGURE 3. The next welding schedule is commenced with the operator depressing push button 210 which opens normally closed relay contacts 226 and thereby deenergizes the upset relay 208 and causes the platens to be moved to the die cleaning position. Thus the cycle is complete.

Thus there has now been described the operation of this system in a typical application and it can be seen that the various advantages claimed therefor are attained.

Still numerous other modifications of the invention will become apparent to one of ordinary skill in the art upon reading the foregoing disclosure. During such a reading, it will be evident that this invention has provided unique equipment for accomplishing the objects and advantages herein stated. Still other objects and advantages and even further modifications will be apparent from this disclosure. It is to be understood, however, that the foregoing disclosure is to be considered exemplary and not limitative, the scope of the invention being defined by the following claims.

What is claimed is:

1. A control system for flash welding systems including a stationary platen for holding one of the workpieces to be welded and a movable platen for holding the other of the workpieces to be welded, said control system comprising means for generating a command signal corresponding to a desired distance of said movable platen from said stationary platen, said command signal generating means including a cam having a non-linear contour, means for driving said cam at substantially constant speed, and linear potentiometer means responsive to the contour of said cam for generating a flashing signal which varies non-linearly with time during the flashing interval of the welding schedule, means for generating a signal indicative of the actual position of the workpieces, and electro-hydraulic servo means responsive to said command signal and said signal indicative of the actual distance of said movable platen for moving said movable platen to said desired distance whenever said command signal and said actual distance indicating signal are not substantially equal in magnitude.

2. A flash welding system operated under the control of digital input control information, said system comprising a stationary platen for holding one of the workpieces to be welded, a movable platen for holding the other workpiece to be welded, means for generating a signal indicative of the actual distance of said movable platen from said stationary platen, means for generating a command signal indicative of the desired distance of said movable platen from said stationary platen and including means responsive to said data processing means for preselecting the flashing distance, said last named means including means for producing mechanical motion, and potentiometer means responsive to said motion producing means for generating an electrical signal at the wiper output thereof, the magnitude of which corresponds to the desired law of motion of said movable platen during the flashing time, means for heating said workpieces, servo means responsive to any difference between said command signal and said actual distance indicating signal for moving said movable platen to said desired distance, and digital data processing means responsive to said digital input control information for determining the command signals applied to said servo means by said command signal generator and for controlling the heat delivered to said workpieces by said heating means.

3. A flash welding system as recited in claim 2 where said data processing means includes a plurality of relays responsive to said digital input control information and where said command signal generating means includes (1) a plurality of series connected resistors and relay contacts respectively associated with said plurality of relays and respectively corresponding to a plurality of possible flashing distances and (2) a signal source, said relay contacts being under the respective control of said relays to select certain ones of said resistors and thereby connect said signal source across said potentiometer means so that a command signal is developed across said potentiometer means which corresponds to the preselected flashing distance.

4. A flash welding system as recited in claim 2 where said command signal generating means includes means for preselecting the flashing time, said flashing time preselecting means being responsive to said data processing means and said preselected flashing time being included in the control information applied to said digital data processing means.

5. A flash welding system as recited in claim 4 where said command signal generating means includes (1) means for producing mechanical motion and (2) potentiometer means responsive to said motion producing means for generating an electrical signal at the wiper output thereof, the magnitude of which corresponds to the desired law of motion of said movable platen during the flashing time.

6. A flash welding system as recited in claim 5 where said data processing means includes a plurality of relays responsive to said digital input control information and where said command signal generating means includes (1) a plurality of resistors and relay contacts associated with said plurality of relays and corresponding to a plurality of possible flashing times and (2) a signal source, said relay contacts being under the respective control of said relays to select certain ones of said resistors and thereby apply said signal source to said motion producing potentiometer wiper at rate corresponding to the preselected flashing time.

7. A flash welding system as recited in claim 6 where a first chain of said resistors are connected in series and where some of said relays have at least two contacts associated therewith for making a coarse selection of said preselected flashing time and other of said relays have at least one contact associated therewith for making a fine selection of said preselected flashing time.

8. A flash welding system as recited in claim 2 where said command signal generating means includes (1) means for producing mechanical motion and (2) potentiometer means responsive to said motion producing means for generating an electrical signal at the wiper output thereof, the magnitude of which corresponds to the desired law of motion of said movable platen during the flashing time.

9. A flash welding system as recited in claim 2, where said heating means includes means for delivering heat to said workpieces during a predetermined time interval of the flash welding sequence, said heat power source including means responsive to said data processing means for preselecting the value of said power during said predetermined time interval and said preselected value of the heat power being included in the control information applied to said digital data processing means.

10. A flash welding system as recited in claim 9 where said predetermined time interval is the flashing time.

11. A flash welding system as recited in claim 9 where said predetermined time interval is the upset current time.

12. A flash welding system as recited in claim 9 where said data processing means includes a plurality of relays responsive to said digital input control information and where said command signal generating means includes (1) a plurality of series connected resistors and relay contacts respectively associated with said plurality of relays and respectively corresponding to a plurality of possible flashing distances and (2) a signal source, said relay contacts being under the respective control of said relays to select certain ones of said resistors and thereby for connecting said signal source across said potentiometer, whereby one of the said relay contacts is closed in response to digital data corresponding to one of said possible flashing distances being applied to said data processing means and thereby developing across said potentiometer a command voltage which corresponds to said flash distance.

13. A flash welding system as recited in claim 2 where said heating means includes means for controlling the length of time heat is delivered to said workpieces during the upset time, said time controlling means including means for preselecting the value of the said length of time and being responsive to said data processing means so that the preselected length of time heat is delivered during said upset time is included in the control information applied to said data processing means.

14. A flash welding system as recited in claim 2 wherein said data processing means is a card reader and digital control information is punched in a card.

15. A flash welding system as recited in claim 2 wherein said data processing means includes a plurality of relays and where said command signal generating means includes (1) a plurality of normally open relay contacts respectively associated with said plurality of relays and respectively corresponding to a plurality of possible flashing distances and (2) a signal source, said relay contacts being under the respective control of said relays for connecting said signal source across said potentiometer, whereby at least one of the said relay contacts is closed in response to digital data corresponding to one of said possible flashing distances being applied to said data processing means and thereby developing across said potentiometer a command voltage which corresponds to said flash distance.

16. A flash welding system as recited in claim 2 wherein said heating means includes an electrical power source, a welding transformer connected between said power source and said workpieces, and means for varying the effective turns ratio of said welding transformer.

17. A flash welding system as recited in claim 16 wherein said means for varying the turns ratio of the transformer includes means for preselecting the turns ratio, the preselecting means being responsive to said data processing means, the preselected turns ratio being included in the control information applied to said digital data processing means.

18. A flash welding system as recited in claim 17 wherein said means for preselecting the turns ratio includes a plurality of magnetic contactor contacts respectively connected to a plurality of taps on the primary winding of said welding transformer.

19. A flash welding system as recited in claim 18 wherein said heating means includes means for selecting a first turns ratio of said welding transformer during a first portion of the flashing interval and means for selecting said preselected turns ratio during a second portion of said flashing interval, said two mentioned means for selecting the turns ratio of the welding transformer being responsive to said command signal generating means.

20. A flash welding system as recited in claim 2 including space bar means for establishing the initial distance between said workpieces preparatory to flashing, space bar positioning means including means for preselecting said initial distance between the workpieces, said initial distance preselecting means being responsive to said data processing means.

21. A flash welding system as recited in claim 20 wherein said command signal generating means includes means for selecting the initial die opening between said platens, said initial die opening selecting means being responsive to said means for preselecting the initial distance between said workpieces, the selected initial die opening being included in the control information applied to said digital data processing means.

22. A flash welding system as recited in claim 21 wherein said command signal generating means includes means for rendering said initial die opening selecting means nonresponsive to said means for preselecting the initial distance between said workpieces after said initial die opening has been selected.

23. A flash welding system as recited in claim 21 wherein said means for preselecting the initial distance between said workpieces includes a motion producing means, a shaft driven by said motion producing means having a plurality of cams mounted thereon, a plurality of switches which are respectively responsive to said plurality of cams, a plurality of relay contacts respectively corresponding to and in series with said switches, a source of electrical power, means responsive to said electrical power source for deenergizing said motion producing means, said relay contacts being responsive to said data processing means so that when one of said contacts is preselected by said data processing means, the electrical power source is connected to said de-energizing means when the associated switch is actuated by one of said cams thereby stopping said space bar means at a point corresponding to the preselected initial distance between said workpieces.

24. A flash welding system as recited in claim 23 wherein said means for selecting the initial die opening includes a multi-position switch, the armature of which is mounted on said shaft, a plurality of relay means respectively connected to the plurality of terminals of said multi-position switch so that when said motion producing means is de-energized, said multi-position switch armature will be connected to the relay means corresponding to the selected initial die opening.

25. A flash welding system as recited in claim 2 including gauge bar means for establishing the final die opening between said platens, gauge bar positioning means including means for preselecting said final die opening, said final die opening preselecting means being responsive to said data processing means.

26. A flash welding system as recited in claim 25 wherein said means for preselecting the final die opening includes a motor, a shaft driven by said motor having a plurality of cam mounted thereon, a plurality of switches which are respectively responsive to said plurality of cams, a plurality of relay contacts respectively corresponding to and in series with said switches, a source of electrical power, means responsive to said electrical power source for de-energizing said motor, said relay contacts being responsive to said data processing means so that when one of said contacts is preselected by said data processing means, the electrical power source is connected to said motor de-energizing means when the associated switch is actuated by one of said cams thereby stopping said gauge bar means at a point corresponding to the preselected final die opening.

27. A flash welding system as recited in claim 2 wherein said command signal generating means includes timing means for providing control signals and thereby controlling the occurrence of various events of the welding schedule.

28. A flash welding system as recited in claim 27 wherein said heating means includes means for delivering a first amount of heat to said workpieces during the flashing and a second amount of heat to said workpieces during upset, said timing means providing a control signal for causing said second amount of heat to be delivered to said workpiece after said flashing time has elapsed and when said upset starts.

29. A flash welding system as recited in claim 27 wherein said heating means includes a welding transformer, means for causing the turns ratio of said welding transformer to have a first value during a first portion of the flashing interval and a second value during a second portion of the flashing interval, said timing means generating a control signal for changing said turns ratio from said first value to said second value when said first portion of the flashing time interval has elapsed and when said second portion of the flashing time interval starts.

30. A flash welding system as recited in claim 27 wherein said timing means generates a control signal when flashing stops and upset starts, and where said command signal generator includes a means responsive to said control signal for switching to upset from flashing.

31. A flash welding system as recited in claim 27 wherein said heating means includes means for preventing the delivery of heat to said workpieces after the upset time has elapsed and second timing means for actuating said preventing means after said upset time interval elapses.

32. A flash welding system as recited in claim 31 wherein said timing means generates a control signal for initiating said second timing means when said upset time commences.

33. A flash welding system as recited in claim 2 including additional means for moving said movable platen towards said stationary platen during upset, said command signal generating means generating a command signal which is impossible to attain so that both means for moving said platen act together to cause said movable platen to move during upset.

34. A flash welding system as recited in claim 33 wherein said upset command signal corresponds to a distance less than the final die opening.

References Cited
UNITED STATES PATENTS

| | | | |
|---|---|---|---|
| 2,724,035 | 11/1955 | Seeloff | 219—97 |
| 2,727,969 | 12/1955 | Platte | 219—100 X |
| 2,770,709 | 11/1956 | Moore et al. | 219—97 |
| 2,892,926 | 6/1959 | Riley et al. | 219—100 X |
| 3,167,635 | 1/1965 | Neidhardt et al. | 219—97 |
| 3,204,078 | 8/1965 | Cavanagh | 219—97 |
| 3,341,685 | 9/1967 | Paton et al. | 219—100 X |

JOSEPH V. TRUHE, Primary Examiner

M. C. FLIESLER, Assistant Examiner